United States Patent [19]

Paul

[11] 4,273,607
[45] Jun. 16, 1981

[54] APPARATUS FOR APPLYING GASKET-FORMING MATERIAL

[76] Inventor: William A. Paul, 1808 Parkside Blvd., Toledo, Ohio 43607

[21] Appl. No.: 90,466

[22] Filed: Nov. 1, 1979

[51] Int. Cl.$^3$ .............................................. B44C 1/00
[52] U.S. Cl. ................................ 156/540; 113/80 B; 113/80 C; 118/213; 118/243; 118/263; 156/230; 156/384; 156/390; 156/566; 156/578; 156/580; 425/110
[58] Field of Search ............... 156/230, 566, 390, 580, 156/540, 384, 578; 113/80 B, 80 C; 118/213, 263, 243; 264/259; 425/110; 100/215

[56] References Cited

U.S. PATENT DOCUMENTS

| 624,835 | 5/1899 | Malchow et al. | 264/259 |
|---|---|---|---|
| 1,145,412 | 7/1915 | Furber | 118/263 |
| 2,264,628 | 12/1941 | Engert et al. | 156/291 |
| 3,232,804 | 2/1966 | Kropfenstein et al. | 156/566 |
| 4,102,304 | 7/1978 | Debenham | 113/80 B |

*Primary Examiner*—John J. Gallagher
*Attorney, Agent, or Firm*—Allen D. Gutchess, Jr.

[57] ABSTRACT

Apparatus is provided for applying a bead of gasket-forming material to a mateable surface of a workpiece. The apparatus includes a source of gasket-forming material and a screen having a predetermined pattern conforming to the desired bead of the gasket-forming material. A spreader applies the gasket-forming material to one side of the screen and the gasket pattern is then formed on an adjacent transfer surface of a transfer pad on the opposite side of the screen. Means are provided for moving the pad with the pattern on the transfer surface and engaging it with the mateable surface of a workpiece mounted on a support spaced from the screen, thereby forming a bead of gasket-forming material on the mateable surface. The transfer surface is moved through an arc of 180° when moving from the screen to the workpiece surface. If desired, two of the transfer surfaces can be positioned on opposite sides of the transfer pad.

14 Claims, 4 Drawing Figures

APPARATUS FOR APPLYING GASKET-FORMING MATERIAL

This invention relates to apparatus for applying beads of gasket-forming material to workpieces.

Gasket-forming material is known in the art for effecting seals between the mateable surfaces of the workpieces. The new material constitutes a substitute for conventional gaskets heretofore known, and as such has a number of advantages. A large gasket inventory is eliminated and there is no need to cut special gaskets for particular applications. Further, conventional gaskets can shrink or wear out to produce loosening and leakage, thereby requiring retorquing, as well as producing disassembly and removal problems. The gasket-forming material, on the other hand, frequently provides an improved seal and effectively seals scratched or otherwise damaged surfaces, as well as improves the structural integrity of the assembled workpieces.

The gasket material is commonly supplied in tubes and a bead of the material is manually spread from a spout of a tube onto the surface of the workpiece which is to be mated with a surface of another workpiece. Templates manipulated by hand have also been used to a limited extent where a number of workpieces are to have the beads of gasket-forming material applied. While the templates for applying the gasket-forming material are satisfactory for a few pieces, they have been inadequate for gasket-type seals on workpieces on a production basis. Further, because of the above-outlined advantages of the gasket-forming material, the desirability of applying the material quickly and accurately in production has accordingly increased.

The present invention provides apparatus for applying the gasket-forming material to mateable surfaces of workpieces in a rapid, accurate, and efficient manner. In accordance with the invention, an applicator supplies gasket material from a source to a transfer surface of a transfer pad. The gasket-forming material is positioned on the pad in a pattern of the same size and shape as the bead of the material which is to be applied to a mateable surface of a workpiece. Moving means moves the transfer pad from the position in which the transfer surface is engageable with the applicator to a position in which the transfer surface is engageable with a workpiece to which the bead is to be applied. The workpiece is mounted on a suitable support which carries the workpiece to a station at which the mateable surface is engaged by the transfer pad and then beyond that station, with other workpieces sequentially moved into position for the application of the gasket-forming beads. The transfer surface is rotated through an arc of 180° as it moves between the applicator and the workpiece. If desired, two transfer surfaces 180° apart can be employed to reduce by one-half the number of arcuate movements required by the transfer pad.

It is, therefore, a principal object of the invention to provide apparatus for applying gasket-forming material to mateable surfaces of a plurality of workpieces.

Another object of the invention is to provide apparatus for applying gasket-forming material to workpiece surfaces more efficiently and rapidly than heretofore.

Many other objects and advantages of the invention will be apparent from the following detailed description of preferred embodiments thereof, reference being made to the accompanying drawings, in which.

Figure 1:
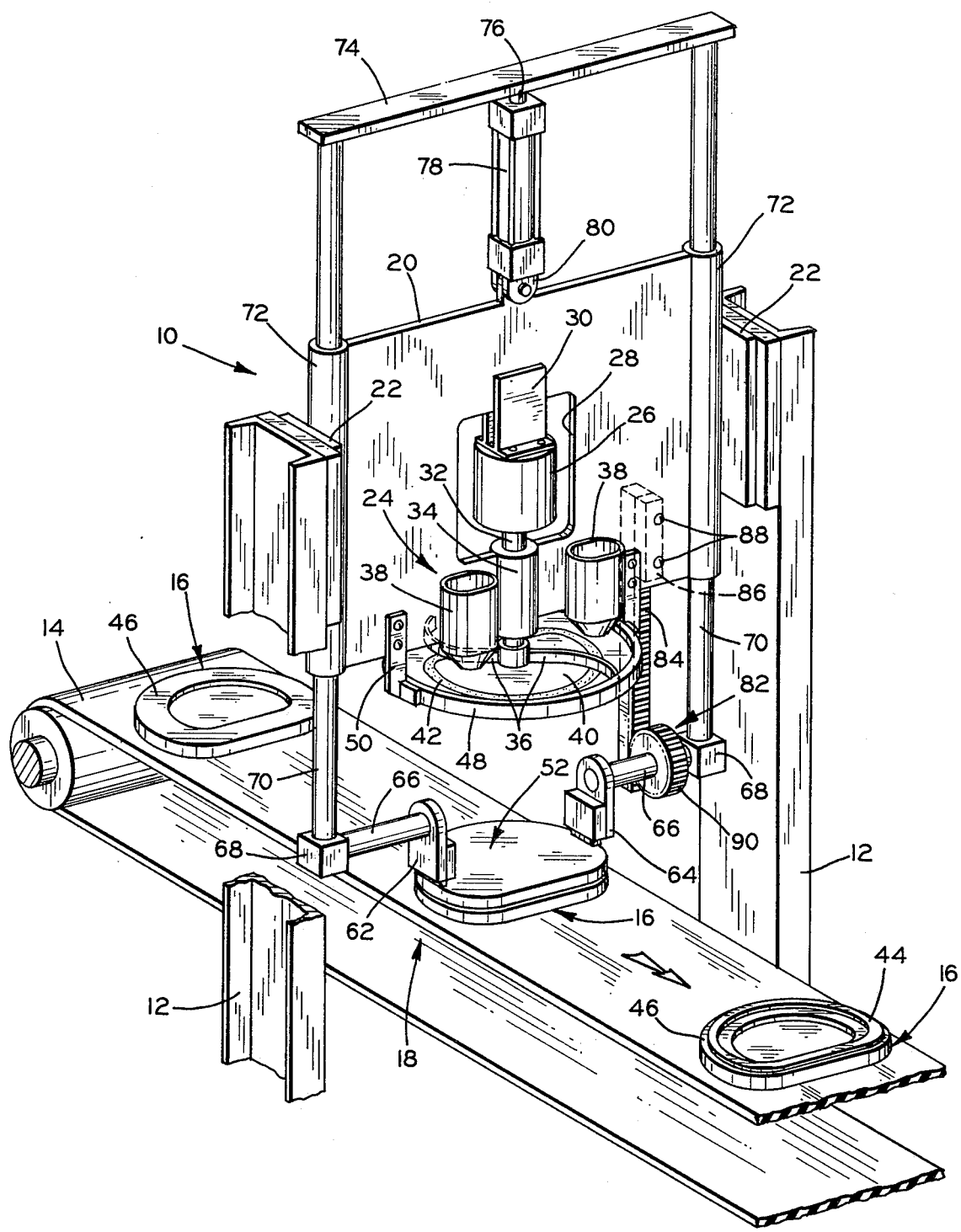
FIG. 1 is a somewhat schematic view in perspective of apparatus for applying beads of gasket-forming material in accordance with the invention.

Referring to the drawings, and particularly to FIG. 1, apparatus for applying beads of gasket-forming material to mateable surfaces of workpieces is indicated at 10. The apparatus includes frame members 12 positioned at the sides of a conveyor 14 which supports workpieces 16. The conveyor sequentially moves the workpieces 16 to and then beyond a bead-applying station indicated at 18.

A supporting plate 20 is supported by the frame members 12 through mounting plates 22, being located directly above the bead-applying station 18. A gasket-forming material applicator is indicated at 24 and is carried by the plate 20. The applicator includes a motor 26, preferably air driven, supported in an opening 28 of the mounting plate 20 by a bracket 30. A motor shaft 32 extends through a bearing 34 to rotatable distributor vanes 36 located below the lower edge of the supporting plate 20. The vanes 36 distribute gasket-forming material from sources 38 which can be containers or tubes suitably mounted on the supporting plate 20. The gasket-forming material is spread over a screen 40 having a pattern 42 formed by minute openings in the screen, which pattern is of the size and shape of a bead 44 of gasket-forming material applied to a mateable surface 46 of the workpiece 16. The screen 40 is held by a circular frame 48 suspended from the supporting plate 20 by brackets 50. A commercially-available screen printer can be used in place of the applicator 24.

Figure 2:
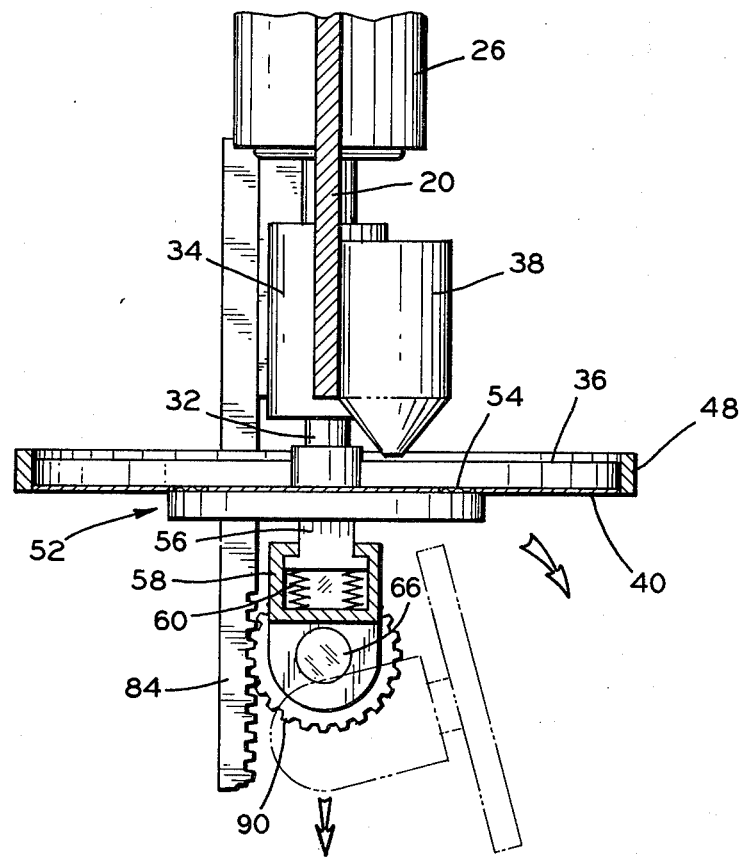
FIG. 2 is a fragmentary, schematic view in vertical cross section of a portion of the apparatus of FIG. 1.
Figure 3:
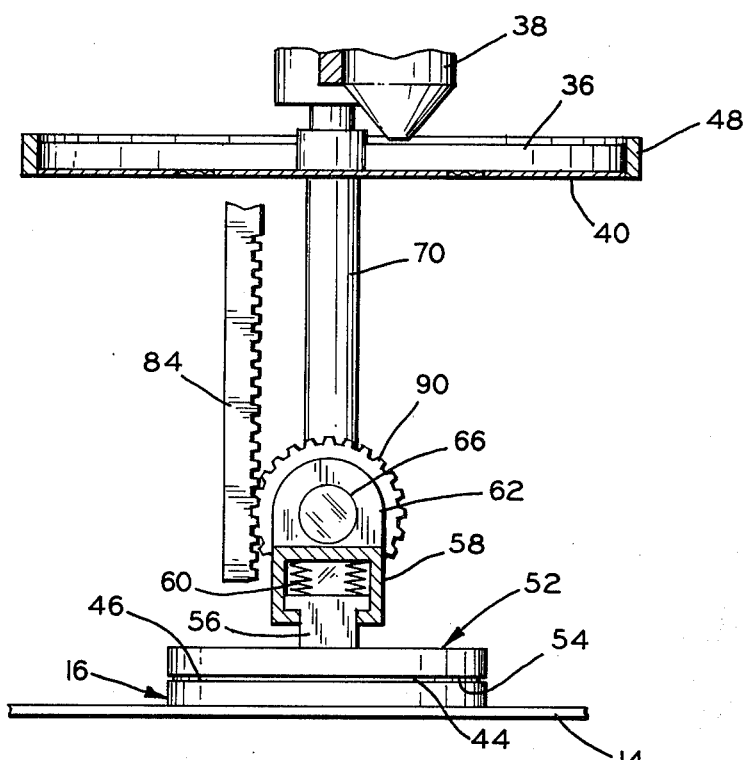
FIG. 3 is a schematic view similar to FIG. 2 of portions of the apparatus of FIG. 1 shown in a different position.

A transfer pad or member 52 has a transfer surface 54 which receives gasket-forming material through the pattern 42 of the screen 40, when in an adjacent position with respect to the lower surface of the screen 40, as shown in FIG. 2. The pad 52 then is moved downwardly and simultaneously through an arc of 180° until the surface 54 is adjacent the workpiece 16. At this time the gasket-forming material is transferred to the workpiece 16 to form the bead 44, as shown in FIG. 3.

The transfer pad 52 is moved between the two positions by suitable moving means. As shown, the pad 52 has rearwardly-extending, T-shaped brackets 56 extending into housings 58, being urged outwardly by springs 60. This arrangement enables the transfer pad 52 to yield as it approaches its two positions. The housings 58 are affixed to ears 62 which, in turn, are affixed to ends of shafts 64 and 66. The shafts have outer ends rotatably mounted in bearing blocks 68 which are carried by lower ends of guide rods 70, which extend upwardly through bearing guides 72 located at the edges of the supporting plate 20. Above the bearing guides 72, the guide rods 70 are affixed to a transverse bar 74. A piston rod 76 is connected to a central portion of the bar 74 and extends upwardly from a fluid-operated cylinder 78 having a lower end connected to the upper edge of the supporting plate 20 by a clevis 80. When the piston rod 76 is extended from the position FIG. 1, the transfer pad 52 is moved from the lower position of FIG. 3 to the upper position of FIG. 2 as the guide rods 70 move upwardly.

To move the transfer pad 52 through the 180° arc to reverse the position of the transfer surface 54, a rack and pinion arrangement indicated at 82 or other suitable means can be employed. In this instance, a rack 84 depends from the supporting plate 20, being suitably mounted thereon by a spacer bar 86 and fasteners 88. A pinion gear 90 is affixed to the shaft 66 and meshes with the rack 84, causing the shafts 64 and 66 to turn during the lineal movement of the guide rods 70.

Figure 4:
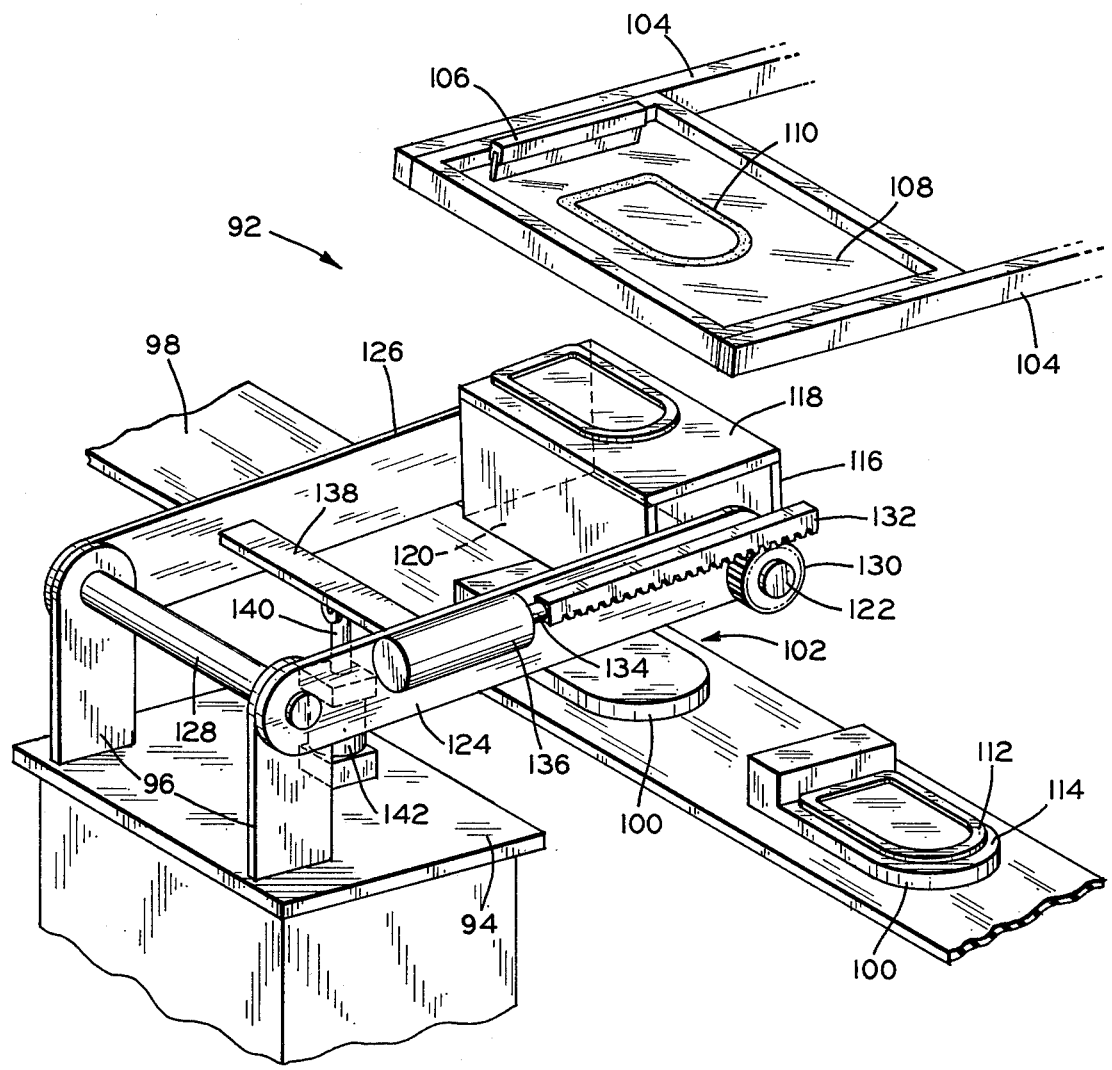
FIG. 4 is a schematic view in perspective of modified apparatus for applying beads of gasket-forming material in accordance with the invention.

A modified gasket-forming apparatus indicated at 92 is shown schematically in FIG. 4. The apparatus 92 includes a suitable mounting stand 94 with upwardly-extending frame members 96 positioned at one side of a workpiece conveyor 98 which supports workpieces 100 and sequentially moves them to and then beyond a bead-applying station indicated at 102. Suitable supporting bars 104 are located above the station 102 and support a gasket material applicator which can be similar to that of FIGS. 1-3 and is represented by a transversely moveable distributor vane 106. Gasket-forming material is spread over a screen 108 having a pattern 110 formed by minute openings, with the pattern being in the size and shape of a bead 112 of the gasket-forming material applied to a mateable surface 114 of the workpiece 100. Again, a commercially-available screen printer can be employed in place of the apparatus 92.

A transfer pad or member 116 has two transfer surfaces 118 and 120 located in parallel relationship and facing in opposite directions. Each of the surfaces 118 and 120 can receive the gasket-forming material through the pattern 110 of the screen 108 when in an adjacent position therewith. When the pad is rotated approximately 180°, that material is then transferred to the workpiece 100 to form the bead thereon.

The transfer pad or member 116 is mounted on shafts 122 which are rotatably carried by outer ends of two pivotable frame members 124 and 126. The other ends of the members 124 and 126 are rotatably mounted on the frame members 96 by a suitable axle 128. One of the shafts 122 has a pinion gear 130 affixed thereto and meshing with a gear rack 132. The rack 132 is affixed to a piston rod 134 extending from a fluid-operated cylinder 136. The transfer member 116 is then caused to rotate through the pinion gear 130 and the rack 132 when the piston rod 134 extends from and retracts into the cylinder 136.

To move the transfer member 116 between the two positions, adjacent to the screen 108 and to the workpiece 100, a transverse bar 138 extends between the members 124 and 126. A piston rod 140 is connected to a central portion of the bar 138 and extends from a fluid-operated cylinder 142.

In the operation of the apparatus 92, the transfer pad 116 need only be moved through an arc of approximately 180° once during each complete up and down cycle, rather than once during the upward movement and once during the downward movement, as is true of the apparatus of FIGS. 1-3. Also, additional transfer surfaces could be employed, especially if different means for rotating the transfer pad were used.

Both of the apparatuses of FIGS. 1-3 and 4 are also capable of forming the gasket bead very close to shoulders or corners of workpieces, as shown in FIG. 4. The tubes 38 of the gasket-forming material can also be cartridges of the type used in applying caulking compound. The material can be dispensed manually or automatically from the source. In addition, the transfer surfaces of the transfer pads can be layers of sponge rubber or neoprene with a thickness of about three-eighths inch, for example.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. Apparatus for applying a bead of gasket-forming material in a pattern of predetermined size and shape to a mateable surface of a workpiece, said apparatus comprising a source of gasket-forming material, a transfer pad having at least one transfer surface conforming to the mateable surface of the workpiece to which the bead of gasket-forming material is to be applied, said transfer surface being wider than the bead of gasket-forming material and larger than the overall size of the pattern of the material so as to be capable of being used with patterns of the gasket-forming material in a variety of sizes and shapes, applicator means for applying gasket-forming material to said transfer surface of said pad from said source in the shape of the bead to be applied to the mateable surface, means for supporting the workpiece, and means for moving said transfer pad from a position with the transfer surface adjacent the mateable surface of the workpiece when on said support to a position with the transfer surface adjacent said applicator means.

2. Apparatus according to claim 1 wherein said applicator means has a lower surface positioned to be parallel to the mateable surface of the workpiece when on said supporting means.

3. Apparatus according to claim 1 characterized by said moving means comprising means for moving said transfer pad through an arc of 180° when traveling between said applicator means and the workpiece surface.

4. Apparatus according to claim 1 characterized by said moving means comprising a rack and pinion, said pinion being mounted on a rotatable shaft connected to said transfer pad to cause said transfer pad to rotate when said pinion is rotated, and means for moving one of said rack and pinion relative to the other.

5. Apparatus according to claim 1 characterized by said applicator means comprising an applicator screen, and means for spreading gasket-forming material from said source over the side of said screen opposite said transfer pad.

6. Apparatus according to claim 1 characterized by said transfer pad having an additional transfer surface parallel to said one transfer surface.

7. Apparatus for applying a bead of gasket-forming material in a pattern of a predetermined size and shape to a mateable surface of a workpiece, said apparatus comprising a transfer member having at least one transfer surface conforming to the mateable surface of the workpiece to which the bead of gasket-forming material is to be applied, said transfer surface being wider than the bead of gasket-forming material and being larger than the overall size of the pattern of the material so as to be capable of being used with patterns of the gasket-forming material in a variety of sizes and shapes, applicator means for applying gasket-forming material to said transfer surface of said member in the size and the shape of the bead to be applied to the mateable surface, and means for moving said transfer member in an arcuate path between a position with the transfer surface adjacent the mateable surface of the workpiece and a position with the transfer surface adjacent said applicator means.

8. Apparatus according to claim 7 characterized by said moving means comprising means for moving said transfer member through an arc of 180° when traveling in at least one direction between said applicator means and the workpiece surface.

9. Apparatus according to claim 7 characterized by said moving means comprising means for moving said transfer member through an arc of 180° when traveling in each direction between said applicator means and the workpiece surface.

10. Apparatus according to claim 8 characterized by said moving means comprising a rack and pinion, said pinion being mounted on a rotatable shaft connected to said transfer pad to cause said transfer pad to rotate when said pinion is rotated, and means for moving one of said rack and pinion relative to the other.

11. Apparatus according to claim 9 characterized by said moving means comprising a rack and pinion, said pinion being mounted on a rotatable shaft connected to said transfer pad to cause said transfer pad to rotate when said pinion is rotated, and means for moving one of said rack and pinion relative to the other.

12. Apparatus according to claim 7 characterized by said applicator means comprising an applicator screen, a source of gasket-forming material comprising at least one tube of the material, and means for spreading gasket-forming material over the side of said screen opposite said transfer member.

13. Apparatus according to claim 7 characterized by transfer member having an additional transfer surface substantially parallel said one transfer surface.

14. Apparatus according to claim 7 characterized by said transfer pad being resiliently carried by said moving means.

* * * * *